United States Patent
Fu (10) Patent No.: US 12,471,144 B2
(45) Date of Patent: Nov. 11, 2025

(54) COMMUNICATION METHOD, COMMUNICATION DEVICE AND STORAGE MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 357 days.

(21) Appl. No.: 18/024,261

(22) PCT Filed: Sep. 3, 2020

(86) PCT No.: PCT/CN2020/113335
§ 371 (c)(1),
(2) Date: Mar. 1, 2023

(87) PCT Pub. No.: WO2022/047713
PCT Pub. Date: Mar. 10, 2022

(65) Prior Publication Data
US 2023/0269773 A1    Aug. 24, 2023

(51) Int. Cl.
*H04W 74/08*    (2024.01)
*H04W 74/0816*    (2024.01)

(52) U.S. Cl.
CPC ... *H04W 74/0816* (2013.01); *H04W 74/0866* (2013.01)

(58) Field of Classification Search
CPC ............. H04W 74/0816; H04W 74/0866
See application file for complete search history.

(56) References Cited

U.S. PATENT DOCUMENTS

| | | | |
|---|---|---|---|
| 2018/0324825 A1* | 11/2018 | Jiang | H04W 72/21 |
| 2020/0163117 A1 | 5/2020 | Jiang et al. | |
| 2020/0383136 A1 | 12/2020 | Xie et al. | |
| 2021/0392683 A1* | 12/2021 | Awadin | H04B 7/0695 |

FOREIGN PATENT DOCUMENTS

| | | |
|---|---|---|
| CN | 107835516 A | 3/2018 |
| CN | 107919929 A | 4/2018 |
| CN | 109392184 A | 2/2019 |
| CN | 110547016 A | 12/2019 |
| WO | 2016119302 A1 | 8/2016 |

OTHER PUBLICATIONS

International Search Report issued in PCT Application No. PCT/CN2020/113335 dated May 25, 2021 with English translation,(4p).
First Search Report issued in CN Application No. 202080002146.3 dated Apr. 3, 2024, (2p).

* cited by examiner

*Primary Examiner* — Derrick V Rose
(74) *Attorney, Agent, or Firm* — Arch & Lake LLP; Hao Tan; Shen Wang (57) ABSTRACT

A communication method, performed by a data transmission end, and including: performing clear channel assessment (CCA) through an assessment beam, wherein the assessment beam is associated with at least one transmission beam for transmitting data.

20 Claims, 5 Drawing Sheets

COMMUNICATION METHOD, COMMUNICATION DEVICE AND STORAGE MEDIUM

CROSS REFERENCE TO RELATED APPLICATION

The present application is a U.S. National Stage of International Application No. PCT/CN2020/113335, filed on Sep. 3, 2020, the entire disclosure of which is incorporated herein by reference for all purposes.

SUMMARY

According to a first aspect of the example of the disclosure, a communication method is provided and is performed by a data transmitter. The communication method includes:
performing clear channel assessment (CCA) through an assessment beam, where one assessment beam is associated with at least one transmission beam for transmitting data.

According to a second aspect of the example of the disclosure, a communication method is provided. The method is performed by a base station and includes:
transmitting beam correspondence information to user equipment (UE), where the beam correspondence information is configured to indicate an assessment beam and at least one transmission beam associated with the assessment beam, the assessment beam being configured for clear channel assessment (CCA) by the UE, and
the transmission beam being configured to transmit data in response to a CCA result indicating that the assessment beam is unoccupied.

According to a third aspect of the example of the disclosure, a communication device is provided. The device includes a processor, a memory, and an executable program stored in the memory and runnable by the processor, where the processor executes steps of the communication method in the first aspect or the steps of the communication method in the second aspect when running the executable program.

According to a fourth aspect of the example of the disclosure, a non-transitory computer readable storage medium is provided and stores an executable program, where the executable program implements steps of the communication method in the first aspect or the steps of the communication method in the second aspect when executed by a processor.

It should be understood that the above general description and the following detailed description are merely illustrative and explanatory, and cannot limit the example of the disclosure.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

Examples will be described in detail here, instances of which are shown in accompanying drawings. When the following description involves the accompanying drawings, the same numbers in different accompanying drawings represent the same or similar elements unless otherwise indicated. Implementations described in the following examples do not represent all implementations consistent with the examples of the disclosure. On the contrary, these implementations are merely instances of apparatuses and methods consistent with some aspects of the examples of the disclosure as detailed in the appended claims.

Terms used in the examples of the disclosure are merely used for describing specific examples rather than limiting the examples of the disclosure. As used in the examples and the appended claims of the disclosure, the singular forms such as "a", "the" and "this" are also intended to include plural forms, unless otherwise clearly stated in the context. It should also be understood that the term "and/or" used here refers to and includes any or all possible combinations of one or more associated listed items.

It should be understood that although terms such as first, second and third can be used in the examples of the disclosure to describe different types of information, the information should not be limited to these terms. These terms are merely used to distinguish the same type of information from each other. For instance, first information can be referred to as second information, and similarly, second information can be referred to as first information, without departing from the scope of the examples of the disclosure. Depending on the context, the word "if" as used here can be interpreted as "at the time of" or "when" or "in response to determining".

Figure 1:
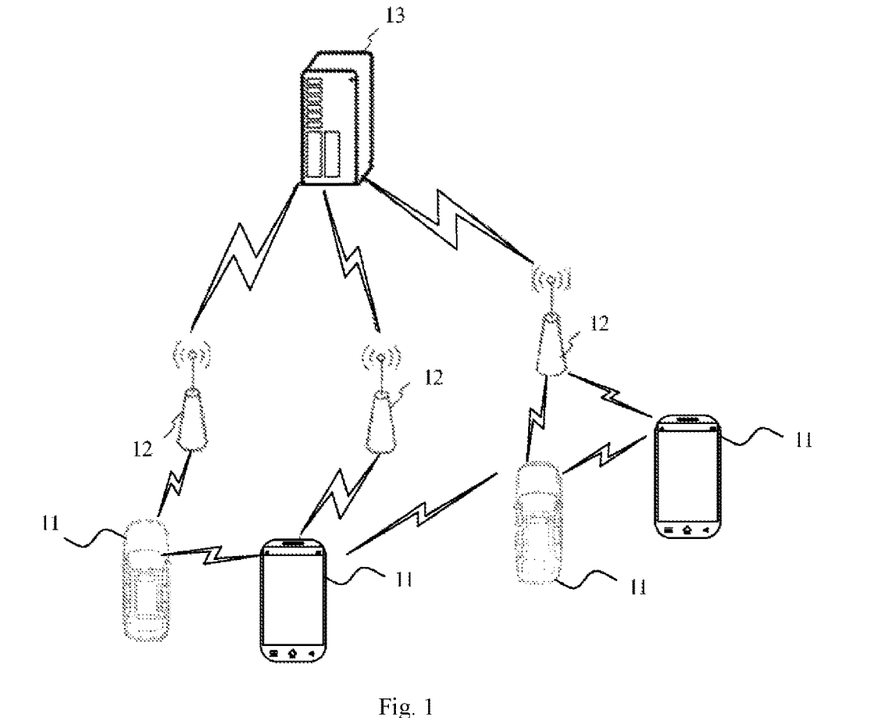
FIG. 1 is a schematic structural diagram of a wireless communication system according to an example.

With reference to FIG. 1, a schematic structural diagram of a wireless communication system according to an example of the disclosure is shown. As shown in FIG. 1, the wireless communication system is a communication system based on cellular mobile communication technology. The wireless communication system may include several terminals 11 and several base stations 12.

The terminal 11 may be a device that provides voice and/or data connectivity for a user. The terminal 11 may communicate with one or more core networks via a radio access network (RAN). The terminal 11 may be an Internet of Things terminal, such as a sensor device, a mobile phone (or a "cellular" phone) and a computer with an Internet of Things terminal. For example, the terminal may be a fixed, portable, pocket-type, handheld, computer built-in or vehicle-mounted apparatus. For example, the terminal may be a station (STA), a subscriber unit, a subscriber station, a mobile station, a mobile, a remote station, an access point, a remote terminal, an access terminal, a user terminal, a user agent, a user device or user equipment (UE). Alternatively, the terminal 11 may be a device of an unmanned aerial vehicle. Alternatively, the terminal 11 may be a vehicle-mounted device, for example, an electronic control unit having a wireless communication function, or a wireless communication device externally connected with an electronic control unit. Alternatively, the terminal 11 may be a roadside device, such as a street lamp, a signal lamp or other roadside devices having a wireless communication function.

The base station 12 may be a network-side device in a wireless communication system. The wireless communication system may be a 4th generation mobile communication (4G) system, also known as a long term evolution (LTE) system. Alternatively, the wireless communication system may be a 5G system, also known as a new radio (NR) system or a 5G NR system. Alternatively, the wireless communication system may be a next-generation system after the 5G system. An access network in the 5G system may be called a new generation-radio access network (NG-RAN) or a machine type communication (MTC) system.

The base station 12 may be an evolved base station (eNB) used in the 4G system. Alternatively, the base station 12 may be a base station (gNB) having a centralized distributed architecture in the 5G system. When having the centralized distributed architecture, the base station 12 usually includes a central unit (CU) and at least two distributed unit (DU). Protocol stacks of a packet data convergence protocol (PDCP) layer, a radio link control (RLC) layer and a media access control (MAC) layer are arranged in the central unit. A physical (PHY) layer protocol stack is arranged in the distributed unit. A specific implementation of the base station 12 is not limited in the example of the disclosure.

A wireless connection may be established between the base station 12 and the terminal 11 through a wireless air interface. In different examples, the wireless air interface is a wireless air interface based on the fourth generation mobile communication network technology (4G) standard. Alternatively, the wireless air interface is a wireless air interface based on the fifth generation mobile communication network technology (5G) standard, for example, the wireless air interface is new radio. Alternatively, the wireless air interface may also be a wireless air interface based on the next generation mobile communication network technology after 5G.

In some examples, an end to end (E2E) connection may also be established between the terminals 11, for example, vehicle to vehicle (V2V) communication, vehicle to infrastructure (V2I) communication and vehicle to pedestrian (V2P) communication in vehicle to everything (V2X).

In some examples, the wireless communication system above may further include a network management device 13.

Several base stations 12 are separately connected to the network management device 13. The network management device 13 may be a core network device in the wireless communication system, for example, the network management device 13 may be a mobility management entity (MME) in an evolved packet core network (EPC). Alternatively, the network management device may be other core network devices, such as serving gateway (SGW), public data network gateway (PGW), a policy and charging rules function (PCRF) or a home subscriber server (HSS). An implementation form of the network management device 13 is not limited in the example of the disclosure.

Execution entities involved in the example of the disclosure include, but are not limited to, UE such as a mobile terminal supporting cellular mobile communication, and a base station.

An application scenario of the example of the disclosure is that in the 5G NR system, in order to enhance coverage and reduce power consumption of the base station, a multi-beam communication mechanism may be used. In a low frequency band, omnidirectional beams or most 4 directional beams may be used, and in a slightly high frequency band, most 8 beams or even 64 beams may be used for communication.

In a high-frequency communication system, for example, in high-frequency communication with NR 52.6 GHz or higher, in order to enhance coverage and suppress channel delays, a relatively fine beam is usually needed to be used. When the terminal is in motion, the base station/terminal needs to change the transmission beam frequently. In the high-frequency communication system, the UE uses a relatively fine transmission beam. When the UE sends uplink data during movement, the UE needs to frequently switch the transmission beam in order to align with a receiver.

Wireless communication technology, such as the 5th generation (5G) cellular mobile communication technology, allows a communication device to transmit data on an unlicensed spectrum. Before a data transmitter occupies the unlicensed spectrum channel to transmit data, a channel requires listening, that is, clear channel assessment (CCA). If the data transmitter determines that the channel is clear after the CCA, the channel will be occupied to transmit data, with the maximum channel occupy time (MCOT) specified by a protocol or configured and indicated by a base station; otherwise, the channel will not be occupied. The above process is generally referred to as a channel access process through listen before talk (LBT) on an unlicensed frequency band. During communication of an unlicensed frequency band, if the terminal switches the beam in a process of transmitting data, the terminal needs to do channel assessment again with a new transmitting beam. Frequent beam switching leads to excessive overheads of channel assessment.

The disclosure relates to, but is not limited to, the technical field of wireless communication, in particular to a communication method, a communication device and a storage medium.

According to a first aspect of the example of the disclosure, a communication method is provided and is performed by a data transmitter. The communication method includes:

performing clear channel assessment (CCA) through an assessment beam, where one assessment beam is associated with at least one transmission beam for transmitting data.

In an example, the method further includes:

transmitting the data through the at least one transmission beam associated with the assessment beam in response to a CCA result indicating that the assessment beam is unoccupied.

In an example, the transmitting the data through the at least one transmission beam associated with the assessment beam includes:

separately transmitting, within maximum channel occupy time (MCOT) of the assessment beam, the data through the at least one transmission beam associated with the assessment beam.

In an example, in response to separately transmitting the data through a plurality of transmission beams associated with the assessment beam, time-domain positions of two time-domain adjacent transmission beams for transmitting data are continuous, or an interval between the time-domain positions of the two time-domain adjacent transmission beams for transmitting the data is less than a predetermined time-domain interval.

In an example, the method further includes:
determining the transmission beam associated with the assessment beam according to beam correspondence information, where the beam correspondence information is configured to indicate the assessment beam and the at least one transmission beam associated with the assessment beam.

In an example, the beam correspondence information is configured to indicate identifiers of reference signals of the assessment beam and the at least one transmission beam associated with the assessment beam.

In an example, the identifier of the reference signal includes at least one of an index of a synchronization signal block (SSB) and an identifier (ID) of a channel status information-reference signal (CSI-RS).

In an example, the method further includes:
receiving the beam correspondence information transmitted by a base station in response to the data transmitter being user equipment (UE).

In an example, the receiving the beam correspondence information transmitted by a base station includes:
receiving radio resource control (RRC) signaling carrying the beam correspondence information.

In an example, the at least one transmission beam associated with the assessment beam is positioned in a coverage range of the assessment beam.

According to a second aspect of the example of the disclosure, a communication method is provided. The method is performed by a base station and includes:
transmitting beam correspondence information to user equipment (UE), where the beam correspondence information is configured to indicate an assessment beam and at least one transmission beam associated with the assessment beam, the assessment beam being configured for clear channel assessment (CCA) by the UE, and
the transmission beam being configured to transmit data in response to a CCA result indicating that the assessment beam is unoccupied.

In an example, the transmitting beam correspondence information to UE includes:
transmitting radio resource control (RRC) signaling carrying the beam correspondence information to the UE.

In an example, the beam correspondence information is configured to indicate identifiers of reference signals of the assessment beam and the at least one transmission beam associated with the assessment beam.

In an example, the identifier of the reference signal includes at least one of an index of a synchronization signal block (SSB) and an identifier (ID) of a channel status information-reference signal (CSI-RS).

In an example, the at least one transmission beam associated with the assessment beam is positioned in a coverage range of the assessment beam.

According to a third aspect of the example of the disclosure, a communication apparatus is provided and applied to a data transmitter. The communication apparatus includes an assessment module, where
the assessment module is configured to perform clear channel assessment (CCA) through an assessment beam, where one assessment beam is associated with at least one transmission beam for transmitting data.

In an example, the apparatus further includes:
a first transmission module configured to transmit the data through the at least one transmission beam associated with the assessment beam in response to a CCA result indicating that the assessment beam is unoccupied.

In an example, the first transmission module includes:
a first transmission sub-module configured to separately transmit, within maximum channel occupy time (MCOT) of the assessment beam, the data through the at least one transmission beam associated with the assessment beam.

In an example, in response to separately transmitting the data through a plurality of transmission beams associated with the assessment beam, time-domain positions of two time-domain adjacent transmission beams for transmitting data are continuous, or an interval between the time-domain positions of the two time-domain adjacent transmission beams for transmitting the data is less than a predetermined time-domain interval.

In an example, the apparatus further includes:
a determination module configured to determine the transmission beam associated with the assessment beam according to beam correspondence information, where the beam correspondence information is configured to indicate the assessment beam and the at least one transmission beam associated with the assessment beam.

In an example, the beam correspondence information is configured to indicate identifiers of reference signals of the assessment beam and the at least one transmission beam associated with the assessment beam.

In an example, the identifier of the reference signal includes at least one of an index of a synchronization signal block (SSB) and an identifier (ID) of a channel status information-reference signal (CSI-RS).

In an example, the apparatus further includes:
a reception module configured to receive the beam correspondence information transmitted by a base station in response to the data transmitter being user equipment (UE).

In an example, the reception module includes:
a reception sub-module configured to receive radio resource control (RRC) signaling carrying the beam correspondence information.

In an example, the at least one transmission beam associated with the assessment beam is positioned in a coverage range of the assessment beam.

According to a fourth aspect of the example of the disclosure, a beam configuration apparatus is provided and is applied to a base station. The apparatus includes a second transmission module, where
the second transmission module is configured to transmit beam correspondence information to user equipment (UE), where the beam correspondence information is configured to indicate an assessment beam and at least one transmission beam associated with the assessment beam, the assessment beam being configured for clear channel assessment (CCA) by the UE, and
the transmission beam being configured to transmit data in response to a CCA result indicating that the assessment beam is unoccupied.

In an example, the second transmission module includes:
a second transmission sub-module configured to transmit radio resource control (RRC) signaling carrying the beam correspondence information to the UE.

In an example, the beam correspondence information is configured to indicate identifiers of reference signals of the assessment beam and the at least one transmission beam associated with the assessment beam.

In an example, the identifier of the reference signal includes at least one of an index of a synchronization signal block (SSB) and an identifier (ID) of a channel status information-reference signal (CSI-RS).

In an example, the at least one transmission beam associated with the assessment beam is positioned in a coverage range of the assessment beam.

According to a fifth aspect of the example of the disclosure, a communication device is provided and includes a processor, a memory, and an executable program stored in the memory and runnable by the processor, where the processor executes steps of the communication method in the first aspect or the steps of the communication method in the second aspect when running the executable program.

According to a sixth aspect of the example of the disclosure, a non-transitory computer readable storage medium is provided and stores an executable program, where the executable program implements steps of the communication method in the first aspect or the steps of the communication method in the second aspect when executed by a processor.

According to the communication method and apparatus, the communication device and the storage medium provided by examples of the disclosure, the data transmitter performs the clear channel assessment (CCA) through the assessment beam, and one assessment beam is associated with at least one transmission beam for transmitting data. In this way, channel occupancy of one or more transmission beams may be determined merely through CCA on the assessment beam associated with the plurality of transmission beams, thus improving efficiency of the CCA on one hand and reducing cost of the CCA compared with CCA on the transmission beam one by one on the other hand.

Figure 2:
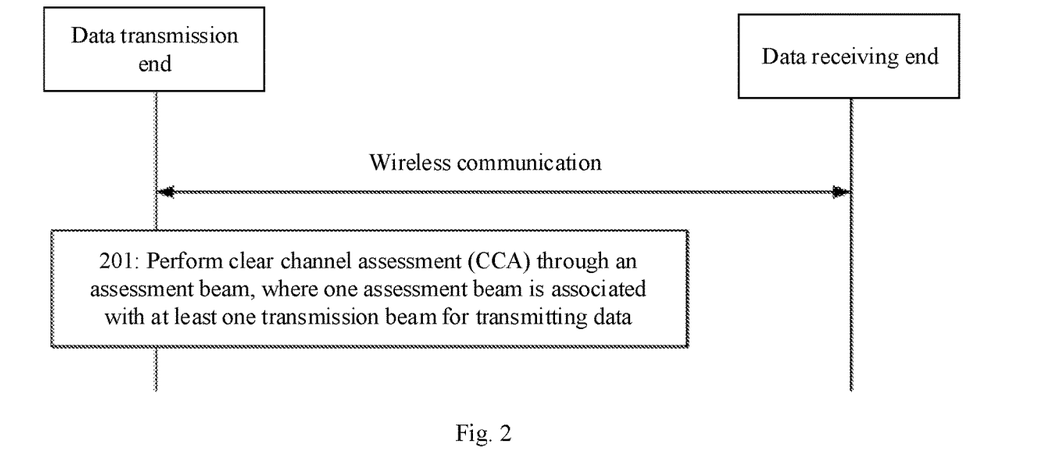
FIG. 2 is a schematic flow diagram of a communication method according to an example.

As shown in FIG. 2, a communication method is provided by this example. The communication method may be performed by a data transmitter of a cellular mobile communication system, and includes step 201.

In step 201, clear channel assessment (CCA) is performed through an assessment beam, where one assessment beam is associated with at least one transmission beam for transmitting data.

Here, the data transmitter may use wireless communication technology to communicate with the data receiver. For example, the data transmitter may be a terminal such as UE or a base station that uses wireless communication technology such as cellular mobile communication technology.

In the case that the data transmitter is the UE, the data receiver may be a base station or another UE. The UE and the base station may perform air interface communication on an unlicensed spectrum. UE and UE may use a direct link, such as sidelink, to communicate on the unlicensed spectrum.

In the case that the data transmitter is the base station, the data receiver may be the UE. The UE and the base station may perform air interface communication on an unlicensed spectrum.

The data transmitter may obtain the transmission beam for transmitting data by beamforming. Different transmission beams may have different directivity or coverage ranges. The data transmitter may also obtain the assessment beam for CCA through a beamforming method, and different assessment beams may have different directivity or coverage ranges.

A CCA result of the detected beam may be configured to represent occupation of the transmission beam associated with the assessment beam. Illustratively, if the CCA result of the assessment beam indicates that a channel is unoccupied, the CCA result may represent that the channel of the transmission beam associated with the assessment beam is unoccupied. If the CCA result of the assessment beam indicates that the channel is occupied, the CCA result may represent that a channel of at least one transmission beam in the transmission beams associated with the assessment beam is occupied.

In an example, the at least one transmission beam associated with the assessment beam is positioned in a coverage range of the assessment beam.

Figure 3:
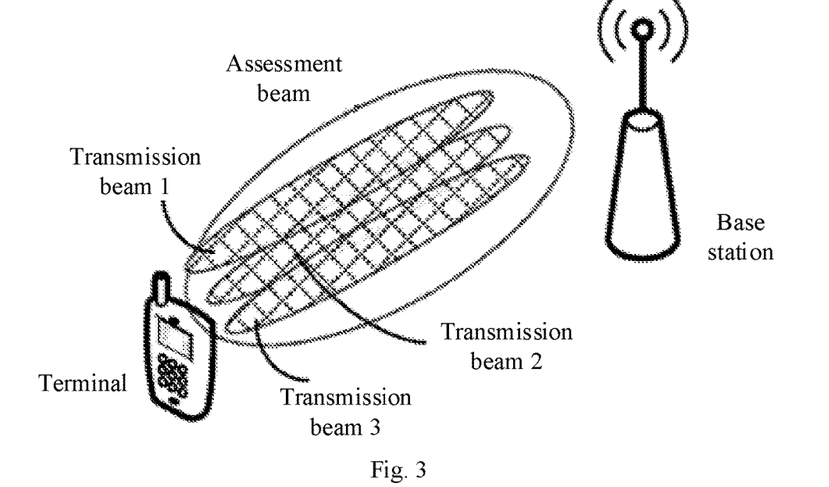
FIG. 3 is a schematic diagram of a relation between an assessment beam and a transmission beam according to an example.

The assessment beam may be a beam with a wider coverage range in spatial domain, and the transmission beam may be a beam with a narrower coverage range in spatial domain. The coverage range of an assessment beam may include one or more transmission beams for transmitting data. For example, as shown in FIG. 3, the coverage range of an assessment beam include transmission beam 1, transmission beam 2 and transmission beam 3. The data transmitter may switch among a plurality of transmission beams and transmit data according to a relative position with the data receiver.

The transmission beam may be a beam for carrying an uplink channel or a beam for carrying a downlink channel. For example, when the UE is used as the data transmitter, the transmission beam may be a beam for carrying a resource such as a physical uplink shared channel (PUSCH) and/or a physical uplink control channel (PUCCH). When the base station is used as the data transmitter, the transmission beam may be a beam for carrying a resource such as a physical downlink shared channel (PDSCH) and/or a physical downlink control channel (PDCCH).

The data transmitter may perform CCA through the assessment beam. The data transmitter may listen to a wireless signal in the coverage range of the assessment beam and determine whether the channel of the assessment beam is clear.

The coverage range of the assessment beam may include one or more transmission beams. When the channel of the assessment beam is clear, a channel of each transmission beam may be determined to be clear. One or more transmission beams included in the coverage range of the assessment beam may at least include beams needed to be switched by the UE when the data transmitter and the data receiver move relative to each other in a certain period of time. Through the CCA on the assessment beam, the data transmitter may determine channel occupancy of the plurality of transmission beams, and reduce a probability of the CCA on a newly switched transmission beam in a process of relative movement of the data transmitter and the data receiver, thus reducing cost of the CCA.

Illustratively, in the case that the data transmitter is the UE, the coverage range of the assessment beam may include one or more transmission beams for uplink data. The UE may perform the CCA on the assessment beam, and thus determine channel occupancy of each transmission beam used for the uplink data. In the case that the data transmitter is the base station, the coverage range of the assessment beam may include one or more transmission beams for downlink data. The base station may perform the CCA on the assessment beam, and thus determine channel occupancy of each transmission beam used for the downlink data.

In this way, channel occupancy of one or more transmission beams may be determined merely through the CCA on the assessment beam associated with the plurality of transmission beams, thus improving efficiency of the CCA on one hand and reducing cost of the CCA compared with CCA on the transmission beam one by one on the other hand.

Figure 4:
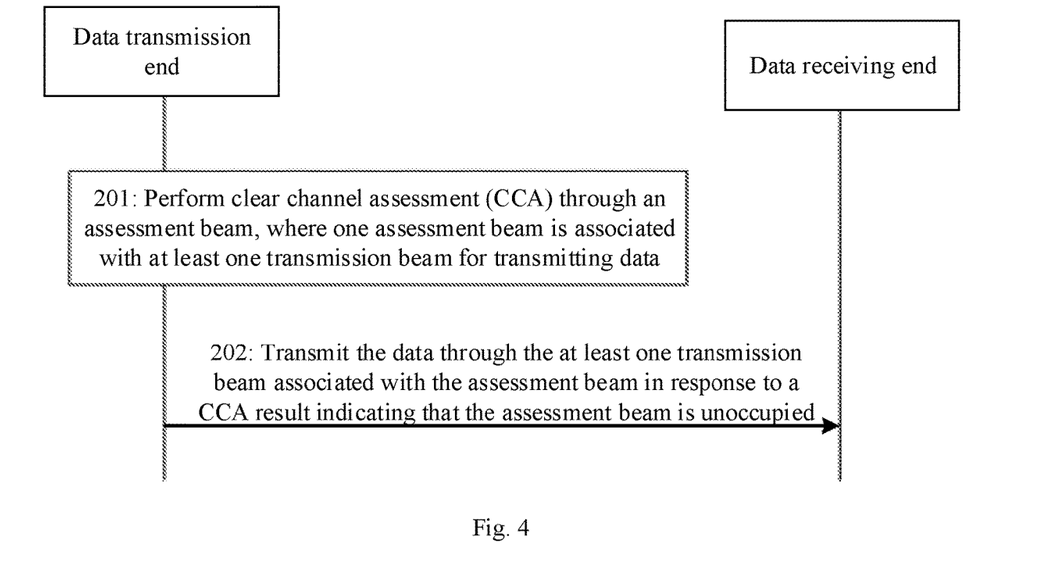
FIG. 4 is a schematic flow diagram of another communication method according to an example.

In an example, as shown in FIG. 4, the method further includes step 202.

In step 202, the data are transmitted through the at least one transmission beam associated with the assessment beam in response to a CCA result indicating that the assessment beam is unoccupied.

When the CCA result of the assessment beam indicates that the channel is unoccupied, the channel of the transmission beam within the coverage range of the assessment beam is unoccupied. The data transmitter may use the transmission beam within the coverage range of the assessment beam to transmit the data. The data transmitter may use one or more transmission beams within the coverage range of the assessment beam to transmit the data.

When the CCA result of the assessment beam indicates that the channel is occupied, the condition that the channel of one or more transmission beams that is unoccupied still exists. The data transmitter may reduce the coverage range of the assessment beam, and perform the CCA on the assessment beam with the coverage range reduced. For example, when the CCA result of the assessment beam indicates that the channel is occupied, the data transmitter may adjust the coverage range of the assessment beam to be consistent with that of a scheduled transmission beam, that is, the CCA is performed on the scheduled transmission beam separately to determine the channel occupancy.

Illustratively, in the case that the data transmitter is the UE, the UE may perform the CCA on the assessment beam. When the CCA result of the assessment beam indicates that the channel is unoccupied, the UE may up data to the base station through the transmission beam within the coverage range of the assessment beam. In the case that the data transmitter is the base station, the base station may perform the CCA on the assessment beam. If the CCA result of the assessment beam indicates that the channel is unoccupied, the base station may down data to the UE through the transmission beam within the coverage range of the assessment beam.

In an example, the step that the data are transmitted through the at least one transmission beam associated with the assessment beam includes:

within maximum channel occupy time (MCOT) of the assessment beam, the data are separately transmitted through the at least one transmission beam associated with the assessment beam.

In order to improve fairness of resource occupation by different devices, the MCOT of the assessment beam may be preset. When the data transmitter determines that the channel of the assessment beam is unoccupied, the data transmission may transmit data within the MCOT. If the data transmitter still needs to occupy the channel after the MCOT, the data transmitter needs to perform the CCA on the assessment beam again, and occupies the channel of the transmission beam after determining that the channel of the assessment beam is clear.

In the case that the UE transmits the uplink data to the base station, the base station may set the MCOT of the assessment beam, and may transmit the MCOT to the UE.

The data transmitter may occupy the plurality of transmission beams simultaneously to transmit the data. The data transmitter may also continuously transmit the data through the plurality of transmission beams by merely occupying a channel of one transmission beam at a time point.

In an example, in response to separately transmitting the data through a plurality of transmission beams associated with the assessment beam, time-domain positions of two time-domain adjacent transmission beams for transmitting data are continuous, or an interval between the time-domain positions of the two time-domain adjacent transmission beams for transmitting the data is less than a predetermined time-domain interval.

In the case that the data transmitter continuously transmits the data through the plurality of transmission beams by occupying a channel of one transmission beam at a time point, an occupation interval of the channels of the plurality of transmission beams needs to meet certain conditions such that an external communication device may not occupy a channel resource of the transmission beam within the occupation interval of the plurality of transmission beams by the data transmitter.

Time-domain positions of channels of the two time-domain adjacent transmission beams occupied by the data transmitter may keep continuous, that is, the channel resources of the two transmission beams occupied, such as PUSCH and/or PUCCH, need to keep continuous.

The interval between the time-domain positions of the channels of the two time-domain adjacent transmission beams occupied by the data transmitter is less than a predetermined time-domain interval, that is, an interval between the channel resources of the two transmission beams occupied, such as PUSCH and/or PUCCH, needs to be less than the predetermined time-domain interval. The predetermined time-domain interval may be determined based on time needed by the external communication device to determine that the transmission beam channel is unoccupied, for example, the predetermined time interval may be 16 us.

In an example, the method further includes:

the transmission beam associated with the assessment beam is determined according to beam correspondence information, where the beam correspondence information is configured to indicate the assessment beam and the at least one transmission beam associated with the assessment beam.

The beam correspondence information may be preset by the base station, etc.

The beam correspondence information may indicate the assessment beam and at least one transmission beam included in the coverage range of the assessment beam.

The beam correspondence information may also indicate the plurality of assessment beams and at least one transmission beam separately included in respective coverage ranges of the plurality of assessment beams.

The base station and the UE may determine the transmission beam corresponding to the assessment beam or the assessment beam corresponding to the transmission beam based on the beam correspondence information.

In an example, the beam correspondence information is configured to indicate identifiers of reference signals of the assessment beam and the at least one transmission beam associated with the assessment beam.

In a 5G standard protocol, the beam is actually represented by the reference signal. The so-called different beams may be embodied by different reference signals in the protocol. Different reference signals have different identifiers.

Here, the beam correspondence information may indicate identifiers of reference signals of an assessment beam and at least one transmission beam included in a coverage range of the assessment beam.

The beam correspondence information may also indicate identifiers of reference signals of the plurality of assessment beams and at least one transmission beam separately included in respective coverage ranges of the plurality of assessment beams.

In an example, the identifier of the reference signal includes at least one of an index of a synchronization signal block (SSB) and an identifier (ID) of a channel status information-reference signal (CSI-RS).

Here, the reference signal may include SSB, CSI-RS, etc. The beam correspondence information may indicate the indexes of the SSBs and/or the IDs of the CSI-RSs of the assessment beam and the transmission beam included in the coverage range of the assessment beam. In this way, the assessment beam and the transmission beam included in the coverage range of the assessment beam may be clearly indicated.

In an example, the method further includes:
the beam correspondence information transmitted by the base station is received in response to the data transmitter being the user equipment (UE).

The base station may transmit the beam correspondence information to the UE, and the beam correspondence information may include one or more assessment beams and one or more transmission beams separately included in the coverage range of each assessment beam.

In an example, the receiving the beam correspondence information transmitted by a base station includes:
radio resource control (RRC) signaling carrying the beam correspondence information is received.

The base station may transmit the beam correspondence information to the UE through the RRC signaling. The beam correspondence information may be transmitted by existing RRC signaling, for example, reserved bits of the existing RRC signaling carry the beam correspondence information. RRC signaling may also be added to carry the beam correspondence information.

Illustratively, the base station may transmit the beam correspondence information before the base station schedules the channel resource for the uplink data to the UE. The base station may transmit the beam correspondence information through the RRC signaling.

When scheduling the uplink data of the UE, the base station may indicate the transmission beam and a listen before talk (LBT) manner of the PUSCH/PUCCH in scheduling downlink control information (DCI).

The UE receives the scheduling DCI and determines the transmission beam of the PUSCH/PUCCH. According to the beam correspondence information, the assessment beam corresponding to the transmission beam is determined, and the CCA on the assessment beam is performed. The uplink data are transmitted when the channel is determined to be unoccupied through the CCA.

When the base station transmits the downlink data, the transmission beam of the downlink data may be determined firstly, the assessment beam corresponding to the transmission beam is determined according to the beam correspondence information, and the CCA may be performed on the assessment beam. The downlink data are transmitted when the channel is determined to be unoccupied through the CCA.

Figure 5:
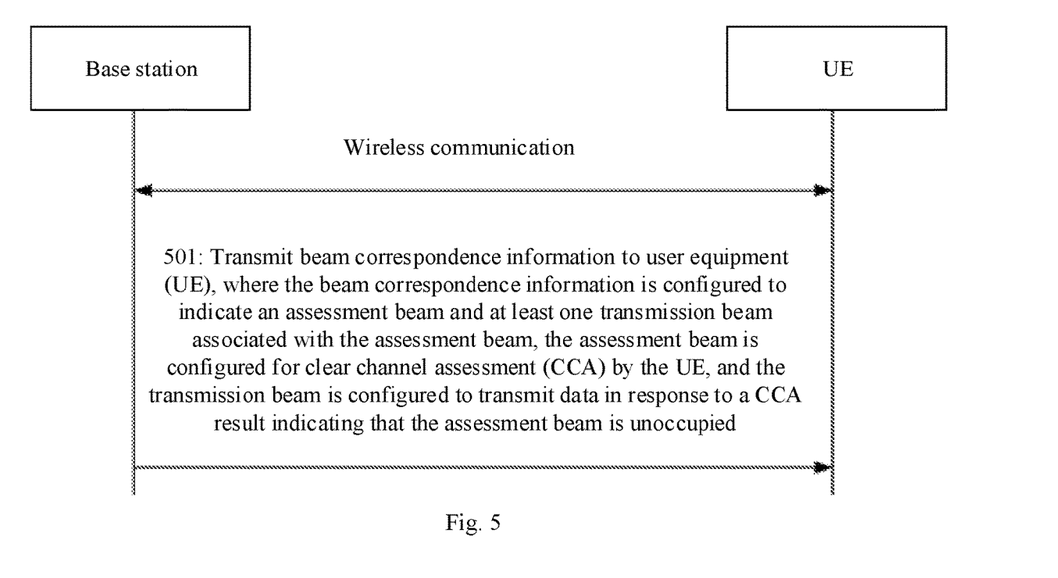
FIG. 5 is a schematic flow diagram of still another communication method according to an example.

As shown in FIG. 5, a communication method is provided by this example. The communication method may be performed by a base station of a cellular mobile communication system, and includes step 501.

In step 501, beam correspondence information is transmitted to user equipment (UE), where the beam correspondence information is configured to indicate an assessment beam and at least one transmission beam associated with the assessment beam, the assessment beam being configured for clear channel assessment (CCA) by the UE, and the transmission beam being configured to transmit data in response to a CCA result indicating that the assessment beam is unoccupied.

Here, the UE may be UE such as a terminal that uses wireless communication technology, for example, cellular mobile communication technology, and the base station may be an access network interface in the cellular mobile communication system. The UE and the base station may perform air interface communication on an unlicensed spectrum.

The UE may obtain the transmission beam for transmitting data by beamforming. Different transmission beams may have different directivity or coverage ranges. The UE may also obtain the assessment beam for CCA through a beamforming method, and different assessment beams may have different directivity or coverage ranges.

A CCA result of the detected beam may be configured to represent occupation of the transmission beam associated with the assessment beam. Illustratively, if the CCA result of the assessment beam indicates that a channel is unoccupied, the CCA result may represent that the channel of the transmission beam associated with the assessment beam is unoccupied. If the CCA result of the assessment beam indicates that the channel is occupied, the CCA result may represent that a channel of at least one transmission beam in the transmission beams associated with the assessment beam is occupied.

In an example, the at least one transmission beam associated with the assessment beam is positioned in a coverage range of the assessment beam.

The assessment beam may be a beam with a wider coverage range in spatial domain, and the transmission beam may be a beam with a narrower coverage range in spatial domain. As shown in FIG. 3, the coverage range of an assessment beam may include one or more transmission beams for transmitting data. The data transmitter may switch among a plurality of transmission beams and transmit data according to a relative position with the data receiver.

The transmission beam may be a beam for carrying an uplink channel or a beam for carrying a downlink channel. For example, when the UE is used as the data transmitter, the transmission beam may be a beam for carrying a resource such as a physical uplink shared channel (PUSCH) and/or a physical uplink control channel (PUCCH). When the base station is used as the data transmitter, the transmission beam may be a beam for carrying a resource such as a physical downlink shared channel (PDSCH) and/or a physical downlink control channel (PDCCH).

The UE may perform CCA through the assessment beam. The UE may listen to a wireless signal in the coverage range of the assessment beam and determine whether the channel of the assessment beam is clear.

The coverage range of the assessment beam may include one or more transmission beams. When the channel of the assessment beam is clear, a channel of each transmission beam may be determined to be clear. One or more transmission beams included in the coverage range of the assessment beam may at least include beams needed to be switched by the UE when the UE and the base station move relative to each other in a certain period of time. Through the CCA on the assessment beam, the UE may determine channel occupancy of the plurality of transmission beams, and reduce a probability of the CCA on a newly switched transmission beam in a process of movement of the UE, thus reducing cost of the CCA.

Illustratively, the coverage range of the assessment beam may include one or more transmission beams for uplink data. The UE may perform the CCA on the assessment beam, and thus determine channel occupancy of each transmission beam used for the uplink data.

The base station may transmit the beam correspondence information to the UE, and the beam correspondence information may include one or more assessment beams and one or more transmission beams separately included in the coverage range of each assessment beam.

In this way, channel occupancy of one or more transmission beams may be determined merely through the CCA on the assessment beam associated with the plurality of transmission beams, thus improving efficiency of the CCA on one hand and reducing cost of the CCA compared with CCA on the transmission beam one by one on the other hand.

In an example, the step that beam correspondence information is transmitted to UE includes:

radio resource control (RRC) signaling carrying the beam correspondence information is transmitted to the UE.

The base station may transmit the beam correspondence information to the UE through the RRC signaling. The beam correspondence information may be transmitted by existing RRC signaling, for example, reserved bits of the existing RRC signaling carry the beam correspondence information. RRC signaling may also be added to carry the beam correspondence information.

The base station may transmit the beam correspondence information before the base station schedules the channel resource for the uplink data to the UE. The base station may transmit the beam correspondence information through the RRC signaling.

When scheduling the uplink data of the UE, the base station may indicate the transmission beam and a listen before talk (LBT) manner of the PUSCH/PUCCH in scheduling downlink control information (DCI).

The UE receives the scheduling DCI and determines the transmission beam of the PUSCH/PUCCH. According to the beam correspondence information, the assessment beam corresponding to the transmission beam is determined, and the CCA on the assessment beam is performed. The uplink data are transmitted when the channel is determined to be unoccupied through the CCA.

When the base station transmits the downlink data, the transmission beam of the downlink data may be determined firstly, the assessment beam corresponding to the transmission beam is determined according to the beam correspondence information, and the CCA may be performed on the assessment beam. The downlink data are transmitted when the channel is determined to be unoccupied through the CCA.

In an example, the beam correspondence information is configured to indicate identifiers of reference signals of the assessment beam and the at least one transmission beam associated with the assessment beam.

In a 5G standard protocol, the beam is actually represented by the reference signal. The so-called different beams may be embodied by different reference signals in the protocol. Different reference signals have different identifiers.

Here, the beam correspondence information may indicate identifiers of reference signals of an assessment beam and at least one transmission beam included in a coverage range of the assessment beam.

The beam correspondence information may also indicate identifiers of reference signals of the plurality of assessment beams and at least one transmission beam separately included in respective coverage ranges of the plurality of assessment beams.

In an example, the identifier of the reference signal includes at least one of an index of a synchronization signal block (SSB) and an identifier (ID) of a channel status information-reference signal (CSI-RS).

Here, the reference signal may include SSB, CSI-RS, etc. The beam correspondence information may indicate the indexes of the SSBs and/or the IDs of the CSI-RSs of the assessment beam and the transmission beam included in the coverage range of the assessment beam. In this way, the assessment beam and the transmission beam included in the coverage range of the assessment beam may be clearly indicated.

A specific example is provided below in conjunction with any example above:

In a 5G standard protocol, the beam may be represented by the reference signal. Different beams are embodied by different reference signals in the protocol. For example, synchronization signal blocks (SSB) with different indexes and channel status information-reference signal (CSI-RS) with different IDs may represent different beams.

The base station may configure one or more beam sets (or reference signal ID sets) for the UE through high-level signaling, such as RRC layer signaling, and each beam set includes:

1. an assessment beam, and
2. one or more transmission beams corresponding to the assessment beam.

The assessment beam is a beam with a wider coverage range in spatial domain, and the transmission beam is a beam with a narrower coverage range in spatial domain. The assessment beam may include one or more transmission beams in this set. The assessment beam itself is also a default transmission beam.

The data transmitter may use the assessment beam to perform the CCA. After channel assessment succeeds, if a plurality of transmission beams in this set are used to separately transmit data in subsequent MCOT, performing CCA again due to switch between the transmission beams is not needed, and data transmission may be started directly instead. Thus, cost of the LBT may be reduced.

On a UE side, in an existing R16 protocol, the DCI for scheduling the PUSCH from the base station to the UE includes a transmission beam of the PUSCH and an LBT mode, but the beam used for CCA is not indicated.

The method of the example of the disclosure may include specific steps:

1. High-level configuration is needed at first. A base station configures an assessment beam and a plurality of transmission beams corresponding to the assessment beam through RRC layer signaling.
2. In actual PUSCH scheduling:

On a base station side, according to a practice of R16, the base station merely indicates a transmission beam and the LBT mode of the PUSCH in the scheduling DCI, and does not need to indicate the assessment beam.

On the UE side: the UE receives the scheduling DCI, and uses an assessment beam corresponding to the transmission beam of the PUSCH to perform the LBT. The assessment beam is determined according to high-level configuration. After the uplink channel is obtained, there is still a PUSCH/PUCCH for subsequent transmission within MCOT, a transmission beam of the PUSCH/PUCCH also corresponds to the same assessment beam, and the PUSCH/PUCCH may be directly used for transmission without the CCA. The PUSCH/PUCCH is required to be continuous in time-domain, or an interval between uplink channels is less than a certain threshold (for example, 16 us); otherwise, channel assessment may have to be performed again because the interval between channels is too long.

It may be specified in the protocol that different LBT modes are allowed for the assessment beam and transmission beam.

Figure 6:
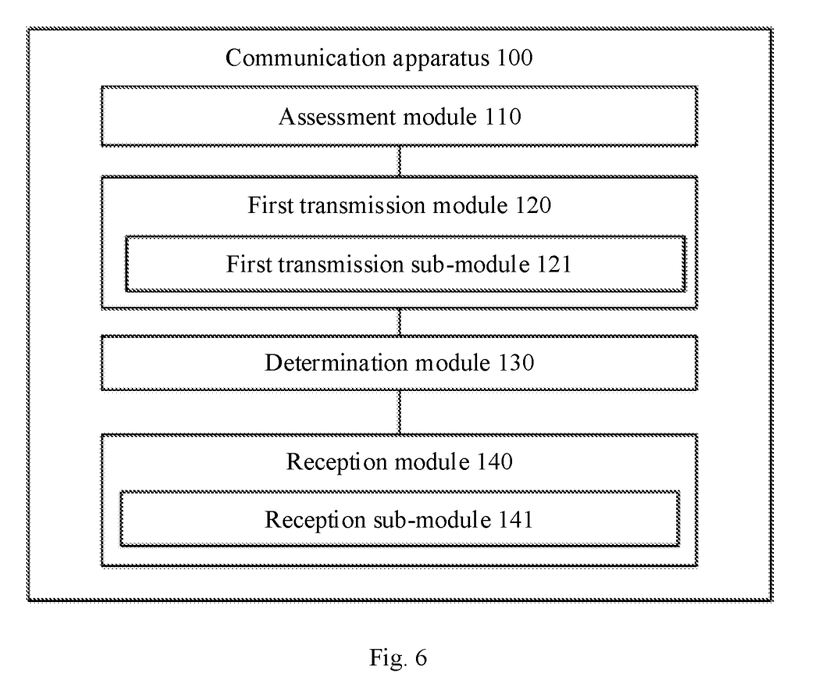
FIG. 6 is a block diagram of a communication apparatus according to an example.

The example of the disclosure further provides a communication apparatus applied to a data transmitter of wireless communication. As shown in FIG. 6, the communication apparatus 100 includes an assessment module 110, where the assessment module 110 is configured to perform clear channel assessment (CCA) through an assessment beam, where one assessment beam is associated with at least one transmission beam for transmitting data.

In an example, the apparatus 100 further includes:
a first transmission module 120 configured to transmit the data through the at least one transmission beam associated with the assessment beam in response to a CCA result indicating that the assessment beam is unoccupied.

In an example, the first transmission module 120 includes:
a first transmission sub-module 121 configured to separately transmit, within maximum channel occupy time (MCOT) of the assessment beam, the data through the at least one transmission beam associated with the assessment beam.

In an example, in response to separately transmitting the data through a plurality of transmission beams associated with the assessment beam, time-domain positions of two time-domain adjacent transmission beams for transmitting data are continuous, or an interval between the time-domain positions of the two time-domain adjacent transmission beams for transmitting the data is less than a predetermined time-domain interval.

In an example, the apparatus 100 further includes:
a determination module 130 configured to determine the transmission beam associated with the assessment beam according to beam correspondence information, where the beam correspondence information is configured to indicate the assessment beam and the at least one transmission beam associated with the assessment beam.

In an example, the beam correspondence information is configured to indicate identifiers of reference signals of the assessment beam and the at least one transmission beam associated with the assessment beam.

In an example, the identifier of the reference signal includes at least one of an index of a synchronization signal block (SSB) and an identifier (ID) of a channel status information-reference signal (CSI-RS).

In an example, the apparatus 100 further includes:
a reception module 140 configured to receive the beam correspondence information transmitted by a base station in response to the data transmitter being user equipment (UE).

In an example, the reception module 140 includes:
a reception sub-module 141 configured to receive radio resource control (RRC) signaling carrying the beam correspondence information.

In an example, the at least one transmission beam associated with the assessment beam is positioned in a coverage range of the assessment beam.

Figure 7:
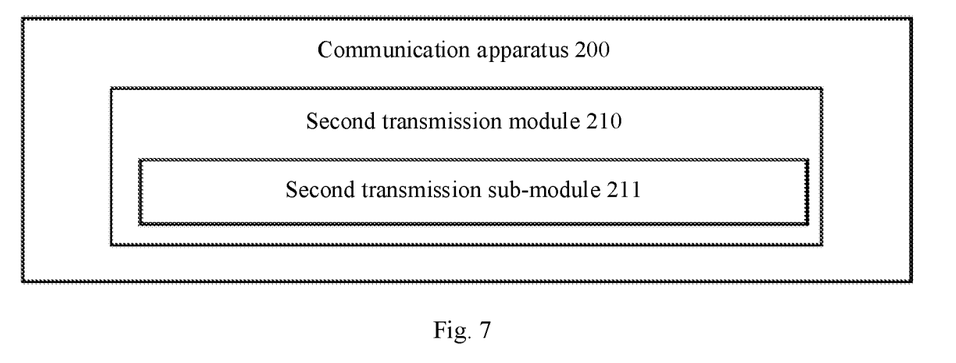
FIG. 7 is a block diagram of another communication apparatus according to an example.

The example of the disclosure further provides a communication apparatus applied to a base station of wireless communication. As shown in FIG. 7, the communication apparatus 200 includes a second transmission module 210, where the second transmission module 210 is configured to transmit beam correspondence information to user equipment (UE), where the beam correspondence information is configured to indicate an assessment beam and at least one transmission beam associated with the assessment beam, the assessment beam being configured for clear channel assessment (CCA) by the UE, and the transmission beam being configured to transmit data in response to a CCA result indicating that the assessment beam is unoccupied.

In an example, the second transmission module 210 includes:
a second transmission sub-module 211 configured to transmit radio resource control (RRC) signaling carrying the beam correspondence information to the UE.

In an example, the beam correspondence information is configured to indicate identifiers of reference signals of the assessment beam and the at least one transmission beam associated with the assessment beam.

In an example, the identifier of the reference signal includes at least one of an index of a synchronization signal block (SSB) and an identifier (ID) of a channel status information-reference signal (CSI-RS).

In an example, the at least one transmission beam associated with the assessment beam is positioned in a coverage range of the assessment beam.

In an example, the assessment module 110, the first transmission module 120, the determination module 130, the reception module 140, the second transmission module 210, etc. may be implemented by one or more central processing units (CPU), graphics processing units (GPU), baseband processors (BP), application specific integrated circuits (ASIC), digital signal processors (DSP), programmable logic devices (PLD), complex programmable logic devices (CPLD), field-programmable gate arrays (FPGA), general-purpose processors, controllers, micro controller units (MCU), microprocessors, or other electronic elements that are configured to execute the foregoing method.

Figure 8:
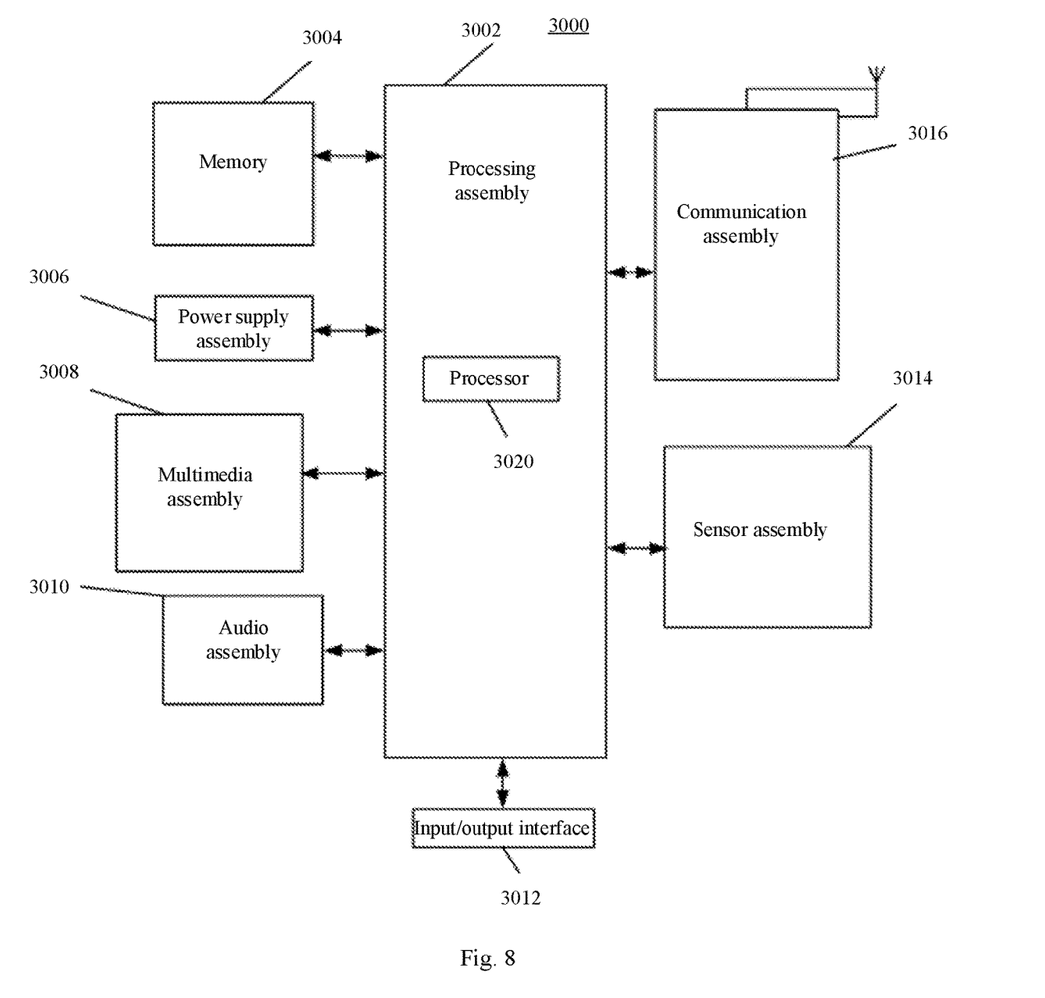
FIG. 8 is a block diagram of a communication apparatus according to an example.

FIG. 8 is a block diagram of a communication apparatus 3000 according to an example. For example, the apparatus 3000 may be a mobile phone, a computer, a digital broadcast terminal, a message transceiving device, a game console, a tablet device, a medical device, a fitness device, a personal digital assistant, etc.

With reference to FIG. 8, the apparatus 3000 may include one or more of a processing assembly 3002, a memory 3004, a power supply assembly 3006, a multimedia assembly 3008, an audio assembly 3010, an input/output (I/O) interface 3012, a sensor assembly 3014, and a communication assembly 3016.

Generally, the processing assembly 3002 controls an overall operation of the apparatus 3000, such as operations associated with display, telephone calls, data communication, camera operations, and recording operations. The processing assembly 3002 may include one or more processors 3020 to execute an instruction, so as to complete all or part of the steps of the above method. In addition, the processing assembly 3002 may include one or more modules to facilitate interaction between the processing assembly 3002 and other assemblies. For example, the processing assembly 3002 may include a multimedia module to facilitate interaction between the multimedia assembly 3008 and the processing assembly 3002.

The memory 3004 is configured to store various types of data to support the operation of the apparatus 3000. Instances of such data include instructions operated on the apparatus 3000 for any application or method, contact data, phonebook data, messages, pictures, video, etc. The memory 3004 may be implemented by any type of volatile or non-volatile storage device, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 3006 energizes various assemblies of the apparatus 3000. The power supply assembly 3006 may include a power management system, one or more power supplies, and other assemblies associated with power generation, management, and distribution for the apparatus 3000.

The multimedia assembly 3008 includes a screen providing an output interface between the apparatus 3000 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touching, swiping, and gestures on the TP. The touch sensors may not merely sense a boundary of a touch or swipe action, but also detect time of duration and a pressure associated with the touch or swipe action. In some examples, the multimedia assembly 3008 includes a front facing camera and/or a rear facing camera. When the apparatus 3000 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capacity.

The audio assembly 3010 is configured to output and/or input audio signals. For example, the audio assembly 3010 includes a microphone (MIC) configured to receive an external audio signal when the apparatus 3000 is in the operation mode, such as a call mode, a recording mode, and a voice recognition mode. The received audio signals may be further stored in the memory 3004 or transmitted via the communication assembly 3016. In some examples, the audio assembly 3010 may further include a speaker for outputting audio signals.

The I/O interface 3012 provides an interface between the processing assembly 3002 and a peripheral interface module that may be a keyboard, a click wheel, a button, etc. These buttons may include, but are not limited to, a home button, a volume button, a start button, and a lock button.

The sensor assembly 3014 includes one or more sensors for providing state assessments in various aspects for the apparatus 3000. For example, the sensor assembly 3014 may detect an on/off state of the apparatus 3000, and relative positioning of assemblies, for example, the assemblies are a display and a keypad of the apparatus 3000. The sensor assembly 3014 may also detect a change in position of the apparatus 3000 or an assembly of the apparatus 3000, presence or absence of contact between the user and the apparatus 3000, orientation or acceleration/deceleration of the apparatus 3000, and temperature change of the apparatus 3000. The sensor assembly 3014 may include a proximity sensor configured to detect presence of nearby objects without any physical contact. The sensor assembly 3014 may further include an optical sensor, such as a complementary metal-oxide-semiconductor transistor (CMOS) or charge-coupled device (CCD) image sensor, for use in imaging applications. In some examples, the sensor assembly 3014 may further include an acceleration sensor, a gyroscope sensor, a magnetic sensor, a pressure sensor, or a temperature sensor.

The communication assembly 3016 is configured to facilitate wired or wireless communication between the apparatus 3000 and other devices. The apparatus 3000 may access a wireless network based on a communication standard, such as WiFi, 2G or 3G, or their combination. In an example, the communication assembly 3016 receives a broadcast signal or broadcast related information from an external broadcast management system via a broadcast channel. In an example, the communication assembly 3016 further includes a near field communication (NFC) module to promote short-range communications. For example, the NFC module may be implemented on the basis of a radio frequency identification (RFID) technology, an infrared data association (IrDA) technology, an ultra wide band (UWB) technology, a Bluetooth (BT) technology, etc.

In an example, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements that are used for executing the method above.

In an example, further provided is a non-transitory computer-readable storage medium including an instruction, for example, a memory 3004 including an instruction, and the instruction above may be executed by the processor 3020 of the apparatus 3000 so as to execute and complete the method above. For example, the non-transitory computer-readable storage medium may be an ROM, RAM, a compact disk (CD)-ROM, a magnetic tape, a floppy disk, an optical data storage device, etc.

Additional non-limiting embodiments of the disclosure include:

1. A communication method, performed by a data transmitter, and including:
   performing clear channel assessment (CCA) through an assessment beam, one assessment beam is associated with at least one transmission beam for transmitting data.

2. The method according to embodiment 1, further including:
   transmitting the data through the at least one transmission beam associated with the assessment beam in response to a CCA result indicating that the assessment beam is unoccupied.

3. The method according to embodiment 2, the transmitting the data through the at least one transmission beam associated with the assessment beam includes:
   separately transmitting, within maximum channel occupy time (MCOT) of the assessment beam, the data through the at least one transmission beam associated with the assessment beam.

4. The method according to embodiment 3, in response to separately transmitting the data through a plurality of transmission beams associated with the assessment beam, time-domain positions of two time-domain adjacent transmission beams for transmitting data are continuous, or an interval between the time-domain positions of the two time-domain adjacent transmission beams for transmitting the data is less than a predetermined time-domain interval.

5. The method according to any one of embodiments 1-4, further including:
   determining the transmission beam associated with the assessment beam according to beam correspondence information, the beam correspondence information is configured to indicate the assessment beam and the at least one transmission beam associated with the assessment beam.

6. The method according to embodiment 5, the beam correspondence information is configured to indicate identifiers of reference signals of the assessment beam and the at least one transmission beam associated with the assessment beam.

7. The method according to embodiment 6, the identifier of the reference signal includes at least one of:
an index of a synchronization signal block (SSB) or an identifier (ID) of a channel status information-reference signal (CSI-RS).

8. The method according to embodiment 5, further including:
receiving the beam correspondence information transmitted by a base station in response to the data transmitter being user equipment (UE).

9. The method according to embodiment 8, the receiving the beam correspondence information transmitted by the base station includes:
receiving radio resource control (RRC) signaling carrying the beam correspondence information.

10. The method according to embodiment 5, further including: the at least one transmission beam associated with the assessment beam is positioned in a coverage range of the assessment beam.

11. A communication method, performed by a base station, and including:
transmitting beam correspondence information to user equipment (UE), the beam correspondence information is configured to indicate an assessment beam and at least one transmission beam associated with the assessment beam,
the assessment beam is configured for clear channel assessment (CCA) by the UE, and
the transmission beam is configured to transmit data in response to a CCA result indicating that the assessment beam is unoccupied.

12. The method according to embodiment 11, the transmitting beam correspondence information to UE includes:
transmitting radio resource control (RRC) signaling carrying the beam correspondence to the UE.

13. The method according to embodiment 11 or 12, the beam correspondence information is configured to indicate identifiers of reference signals of the assessment beam and the at least one transmission beam associated with the assessment beam.

14. The method according to embodiment 13, the identifier of the reference signal includes at least one of an index of a synchronization signal block (SSB) or an identifier (ID) of a channel status information-reference signal (CSI-RS).

15. The method according to embodiment 11 or 12, the at least one transmission beam associated with the assessment beam is positioned in a coverage range of the assessment beam.

16. A communication apparatus, applied to a data transmitter, and including an assessment module, the assessment module is configured to perform clear channel assessment (CCA) through an assessment beam, one assessment beam is associated with at least one transmission beam for transmitting data.

17. The apparatus according to embodiment 16, further including:
a first transmission module configured to transmit the data through the at least one transmission beam associated with the assessment beam in response to a CCA result indicating that the assessment beam is unoccupied.

18. The apparatus according to embodiment 17, the first transmission module includes:
a first transmission sub-module configured to separately transmit, within maximum channel occupy time (MCOT) of the assessment beam, the data through the at least one transmission beam associated with the assessment beam.

19. The apparatus according to embodiment 18, in response to separately transmitting the data through a plurality of transmission beams associated with the assessment beam, time-domain positions of two time-domain adjacent transmission beams for transmitting data are continuous, or an interval between the time-domain positions of the two time-domain adjacent transmission beams for transmitting the data is less than a predetermined time-domain interval.

20. The apparatus according to any one of embodiments 16-19, further including:
a determination module configured to determine the transmission beam associated with the assessment beam according to beam correspondence information, the beam correspondence information is configured to indicate the assessment beam and the at least one transmission beam associated with the assessment beam.

21. The apparatus according to embodiment 20, the beam correspondence information is configured to indicate identifiers of reference signals of the assessment beam and the at least one transmission beam associated with the assessment beam.

22. The apparatus according to embodiment 21, the identifier of the reference signal includes at least one of an index of a synchronization signal block (SSB) or an identifier (ID) of a channel status information-reference signal (CSI-RS).

23. The apparatus according to embodiment 20, further including:
a reception module configured to receive the beam correspondence information transmitted by a base station in response to the data transmitter being user equipment (UE).

24. The apparatus according to embodiment 23, the reception module includes:
a reception sub-module configured to receive radio resource control (RRC) signaling carrying the beam correspondence information.

25. The apparatus according to embodiment 20, the at least one transmission beam associated with the assessment beam is positioned in a coverage range of the assessment beam.

26. A communication apparatus, applied to a base station, and including a second transmission module, the second transmission module is configured to transmit beam correspondence information to user equipment (UE), the beam correspondence information is configured to indicate an assessment beam and at least one transmission beam associated with the assessment beam, the assessment beam is configured for clear channel assessment (CCA) by the UE, and
the transmission beam is configured to transmit data in response to a CCA result indicating that the assessment beam is unoccupied.

27. The apparatus according to embodiment 26, the second transmission module includes:
a second transmission sub-module configured to transmit radio resource control (RRC) signaling carrying the beam correspondence information to the UE.

28. The apparatus according to embodiment 26 or 27, the beam correspondence information is configured to indicate identifiers of reference signals of the assessment beam and the at least one transmission beam associated with the assessment beam.

29. The apparatus according to embodiment 28, where the identifier of the reference signal includes at least one of an index of a synchronization signal block (SSB) or an identifier (ID) of a channel status information-reference signal (CSI-RS).

30. The apparatus according to embodiment 26 or 27, the at least one transmission beam associated with the assessment beam is positioned in a coverage range of the assessment beam.

31. A communication device apparatus, including a processor, a memory, and an executable program stored in the memory and runnable by the processor, the processor executes steps of the communication method according to any one of embodiments 1-10 or 11-15 when running the executable program.

32. A non-transitory computer readable storage medium, storing an executable program, the executable program implements steps of the communication method according to any one of embodiments 1-10 or 11-15 when executed by a processor.

Those skilled in the art could easily conceive of other implementation solutions of the examples of the disclosure upon consideration of the description and implementation of the disclosure here. The disclosure is intended to cover any variation, use or adaptive change of the disclosure, which follows general principles of the example of the disclosure and includes common general knowledge or conventional technical means in the technical field not disclosed in example of the disclosure. The description and the example are merely considered illustrative, and a true scope and spirit of the example of the disclosure are indicated by the following claims.

It should be understood that the examples of the disclosure are not limited to precise structures described above and shown in the accompanying drawings, and various modifications and changes can be made without departing from the scope of the disclosure. The scope of the example of the disclosure is merely limited by the appended claims.

What is claimed is:

1. A communication method, performed by a data transmitter, and comprising:
   performing clear channel assessment (CCA) through an assessment beam, wherein the assessment beam is associated with at least one transmission beam for transmitting data;
   wherein performing the CCA through the assessment beam comprises:
   reducing coverage range of the assessment beam in a case where a CCA result of the assessment beam indicates that a channel is occupied, and performing the CCA on the assessment beam with the reduced coverage range;
   transmitting the data through the at least one transmission beam associated with the assessment beam in response to the CCA result indicating that the assessment beam is unoccupied;
   wherein time-domain positions of two time-domain adjacent transmission beams for transmitting the data are continuous, or an interval between the time-domain positions of the two time-domain adjacent transmission beams for transmitting the data is less than a predetermined time-domain interval, in response to separately transmitting the data through a plurality of transmission beams associated with the assessment beam; and
   wherein the predetermined time-domain interval causes an external device to not occupy the transmission beam within an interval of the plurality of transmission beams.

2. The communication method according to claim 1, wherein transmitting the data through the at least one transmission beam associated with the assessment beam comprises:
   separately transmitting, within maximum channel occupy time (MCOT) of the assessment beam, the data through the at least one transmission beam associated with the assessment beam.

3. The communication method according to claim 1, further comprising:
   determining the transmission beam associated with the assessment beam according to beam correspondence information, wherein the beam correspondence information is configured to indicate the assessment beam and the at least one transmission beam associated with the assessment beam.

4. The communication method according to claim 3, wherein the beam correspondence information is configured to indicate identifiers of reference signals of the assessment beam and the at least one transmission beam associated with the assessment beam.

5. The communication method according to claim 4, wherein the identifier of the reference signal comprises at least one of:
   an index of a synchronization signal block (SSB) or an identifier (ID) of a channel status information-reference signal (CSI-RS).

6. The communication method according to claim 3, further comprising:
   receiving the beam correspondence information transmitted by a base station in response to the data transmitter being a user equipment (UE).

7. The communication method according to claim 6, wherein receiving the beam correspondence information transmitted by the base station comprises:
   receiving radio resource control (RRC) signaling carrying the beam correspondence information.

8. The communication method according to claim 3, wherein the at least one transmission beam associated with the assessment beam is positioned in the coverage range of the assessment beam.

9. A communication method, performed by a base station, and comprising:
   transmitting beam correspondence information to a user equipment (UE), wherein the beam correspondence information is configured to indicate an assessment beam and at least one transmission beam associated with the assessment beam, wherein,
   the assessment beam is configured for the UE to perform clear channel assessment (CCA), reduce coverage range of the assessment beam in a case where a CCA result of the assessment beam indicates that a channel is occupied, and perform the CCA on an assessment beam with the reduced coverage range, and
   the transmission beam is configured to transmit data in response to the CCA result indicating that the assessment beam is unoccupied;
   wherein time-domain positions of two time-domain adjacent transmission beams for transmitting the data are continuous, or an interval between the time-domain positions of the two time-domain adjacent transmission beams for transmitting the data is less than a predetermined time-domain interval, in a case that a plurality of transmission beams are configured to transmit the data; and wherein the predetermined time-domain interval causes an external device to not occupy the transmission beam within an interval of the plurality of transmission beams.

10. The communication method according to claim 9, wherein transmitting the beam correspondence information to the UE comprises:
transmitting radio resource control (RRC) signaling carrying the beam correspondence information to the UE.

11. The communication method according to claim 9, wherein the beam correspondence information is configured to indicate identifiers of reference signals of the assessment beam and the at least one transmission beam associated with the assessment beam.

12. The communication method according to claim 11, wherein the identifier of the reference signal comprises at least one of an index of a synchronization signal block (SSB) or an identifier (ID) of a channel status information-reference signal (CSI-RS).

13. The communication method according to claim 9, wherein the at least one transmission beam associated with the assessment beam is positioned in the coverage range of the assessment beam.

14. A communication device, comprising:
a processor;
a memory; and
an executable program stored in the memory and runnable by the processor, wherein the processor is configured to:
perform clear channel assessment (CCA) through an assessment beam, wherein the assessment beam is associated with at least one transmission beam for transmitting data;
wherein the processor is further configured to:
reduce coverage range of the assessment beam in a case where a CCA result of the assessment beam indicates that a channel is occupied, and perform the CCA on the assessment beam with the reduced coverage range;
transmit the data through the at least one transmission beam associated with the assessment beam in response to the CCA result indicating that the assessment beam is unoccupied;
wherein time-domain positions of two time-domain adjacent transmission beams for transmitting the data are continuous, or an interval between the time-domain positions of the two time-domain adjacent transmission beams for transmitting the data is less than a predetermined time-domain interval, in response to separately transmitting the data through a plurality of transmission beams associated with the assessment beam; and wherein the predetermined time-domain interval causes an external device to not occupy the transmission beam within an interval of the plurality of transmission beams.

15. A non-transitory computer readable storage medium, storing an executable program, wherein the executable program implements steps of the communication method according to claim 1 when executed by a processor.

16. A communication device, comprising:
a processor;
a memory; and
an executable program stored in the memory and runnable by the processor, wherein the processor executes steps of the communication method according to claim 9 when running the executable program.

17. A non-transitory computer readable storage medium, storing an executable program, wherein the executable program implements steps of the communication method according to claim 9 when executed by a processor.

18. The communication method according to claim 1, wherein the at least one transmission beam comprises a beam that needs to be switched by the data transmitter in a case where the data transmitter and a data receiver move relative to each other.

19. The communication method according to claim 1, wherein the at least one transmission beam is obtained by beamforming, and different transmission beams have different directivity or coverage ranges.

20. The communication method according to claim 1, wherein the assessment beam is a beam with a wider coverage range in spatial domain, and the transmission beam is a beam with a narrower coverage range in the spatial domain.

* * * * *